(No Model.) 5 Sheets—Sheet 1.

A. GARDNER.
ELEVATING AND PACKING MECHANISM FOR HARVESTERS.

No. 491,680. Patented Feb. 14, 1893.

Witnesses
E. J. Nottingham
G. F. Downing

Inventor
Andrew Gardner
By H. A. Seymour
Attorney (No Model.) 5 Sheets—Sheet 2.
A. GARDNER.
ELEVATING AND PACKING MECHANISM FOR HARVESTERS.
No. 491,680. Patented Feb. 14, 1893.

(No Model.) 5 Sheets—Sheet 3.

A. GARDNER.
ELEVATING AND PACKING MECHANISM FOR HARVESTERS.

No. 491,680. Patented Feb. 14, 1893.

Witnesses
E. J. Nottingham
G. F. Downing

Inventor
Andrew Gardner
By H. A. Seymour
Attorney (No Model.) 5 Sheets—Sheet 4.
A. GARDNER.
ELEVATING AND PACKING MECHANISM FOR HARVESTERS.
No. 491,680. Patented Feb. 14, 1893.
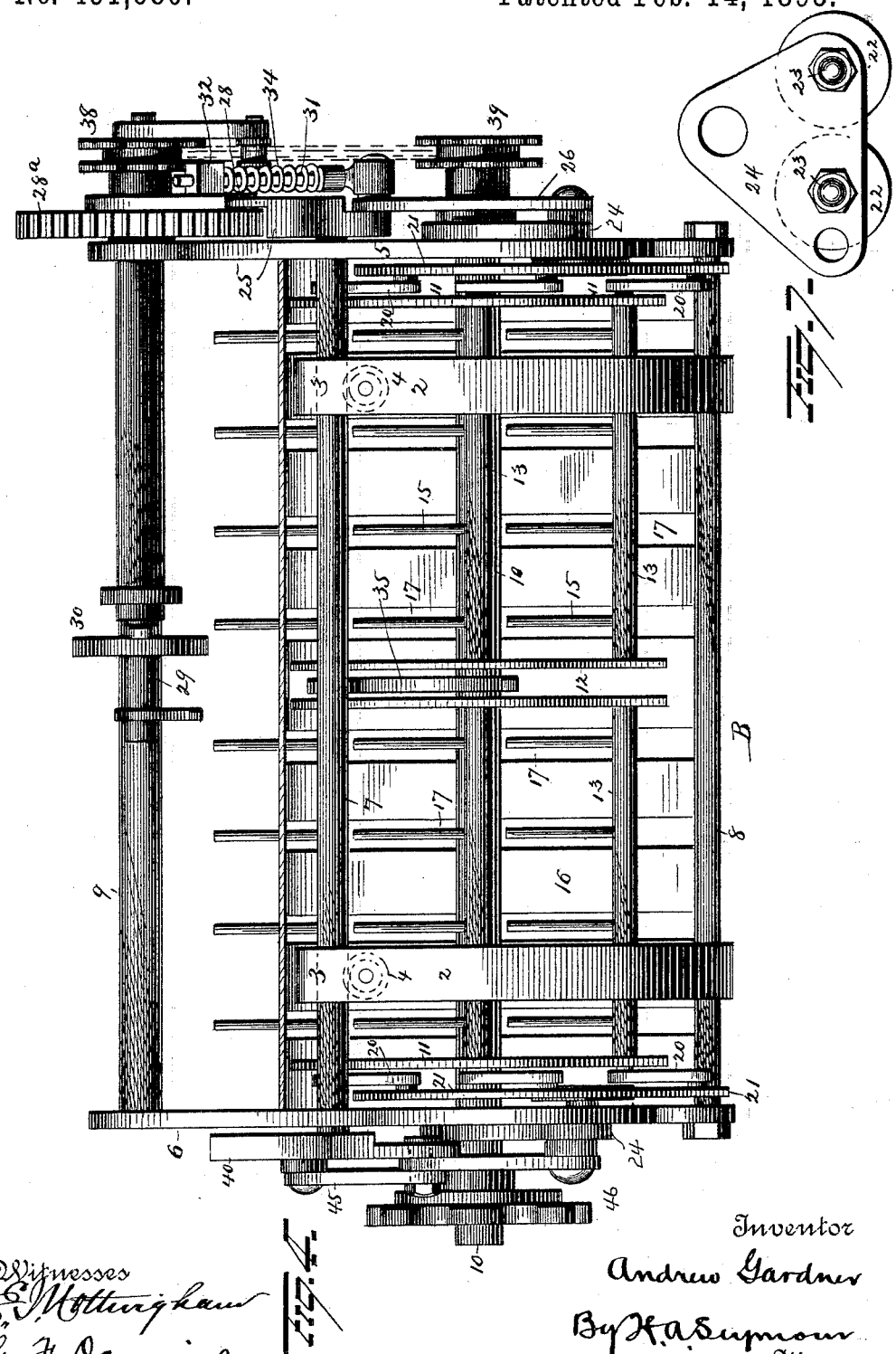

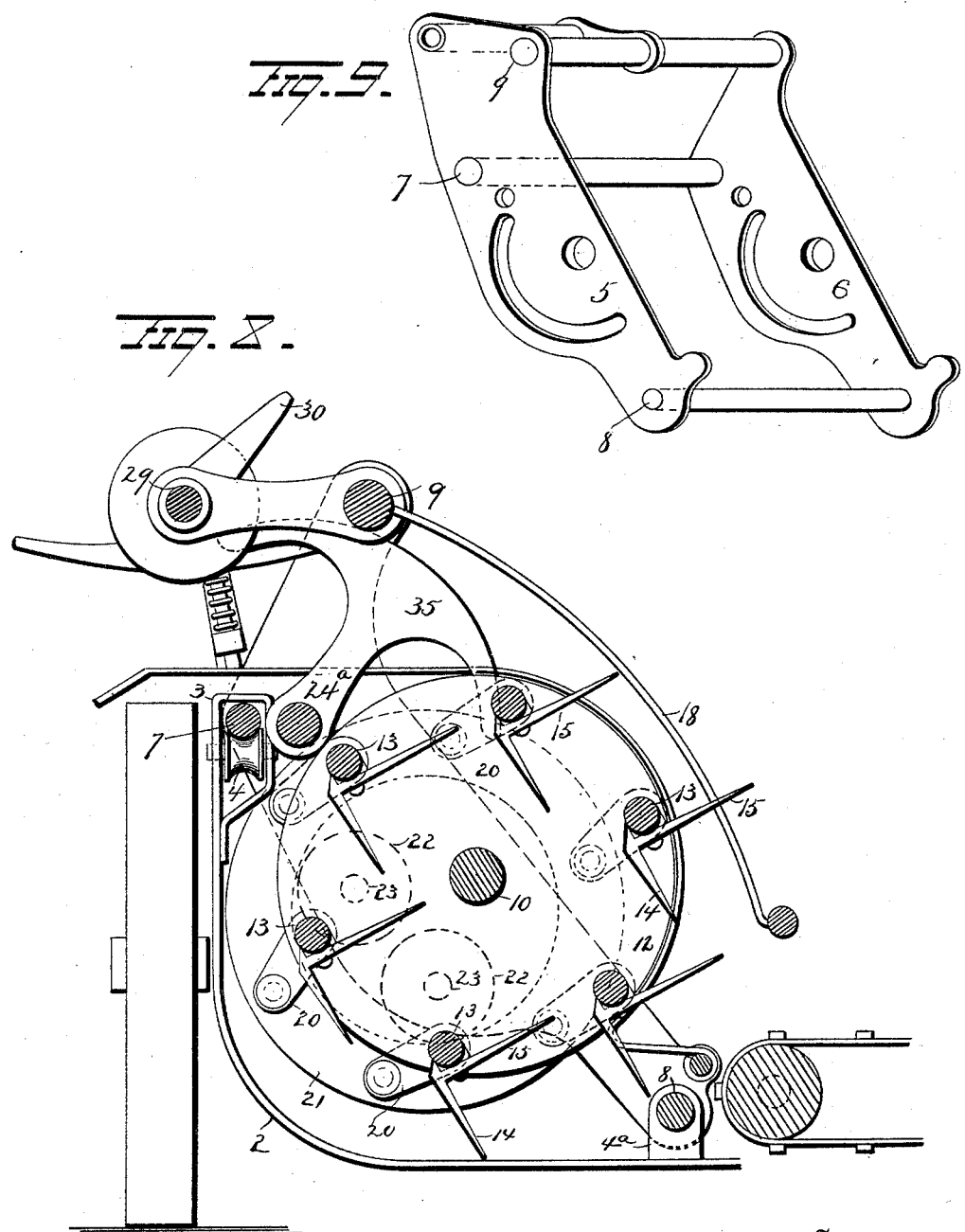

UNITED STATES PATENT OFFICE.

ANDREW GARDNER, OF ATLANTIC, IOWA.

ELEVATING AND PACKING MECHANISM FOR HARVESTERS.

SPECIFICATION forming part of Letters Patent No. 491,680, dated February 14, 1893.

Application filed March 17, 1891. Serial No. 385,403. (No model.)

*To all whom it may concern:*

Be it known that I, ANDREW GARDNER, of Atlantic, in the county of Cass and State of Iowa, have invented certain new and useful Improvements in Elevating and Packing Mechanism for Harvesters; and I do hereby declare the following to be a full, clear, and exact description of the invention, such as will enable others skilled in the art to which it appertains to make and use the same.

My invention relates to an improvement in elevating and packing mechanism for self binding harvesters, the object being to provide means for elevating grain in a self binding harvester from the platform conveyer to a point on a level or slightly above a level with the top of the driving wheel, straighten the grain when coming obliquely to the elevators and pack it into a bundle receptacle.

Further objects are to provide means for automatically starting the binding mechanism when sufficient grain has accumulated to form a bundle, separate the incoming grain from the bundle, and adjust the binder to the center of the grain.

With these ends in view, my invention consists primarily in a sectional revolving rake constructed as claimed and adapted to elevate the grain from the platform conveyer to slightly above a level with the top of the driving wheel and pack it into a bundle receptacle.

My invention further consists in combining this rake with a binding mechanism so as to bring an underlying needle normally between the two sections of the rake and thereby within the compass of the rake teeth.

The invention further consists in certain novel features of construction and combinations of parts which will be hereinafter described and pointed out in the claims.

Figure 1:
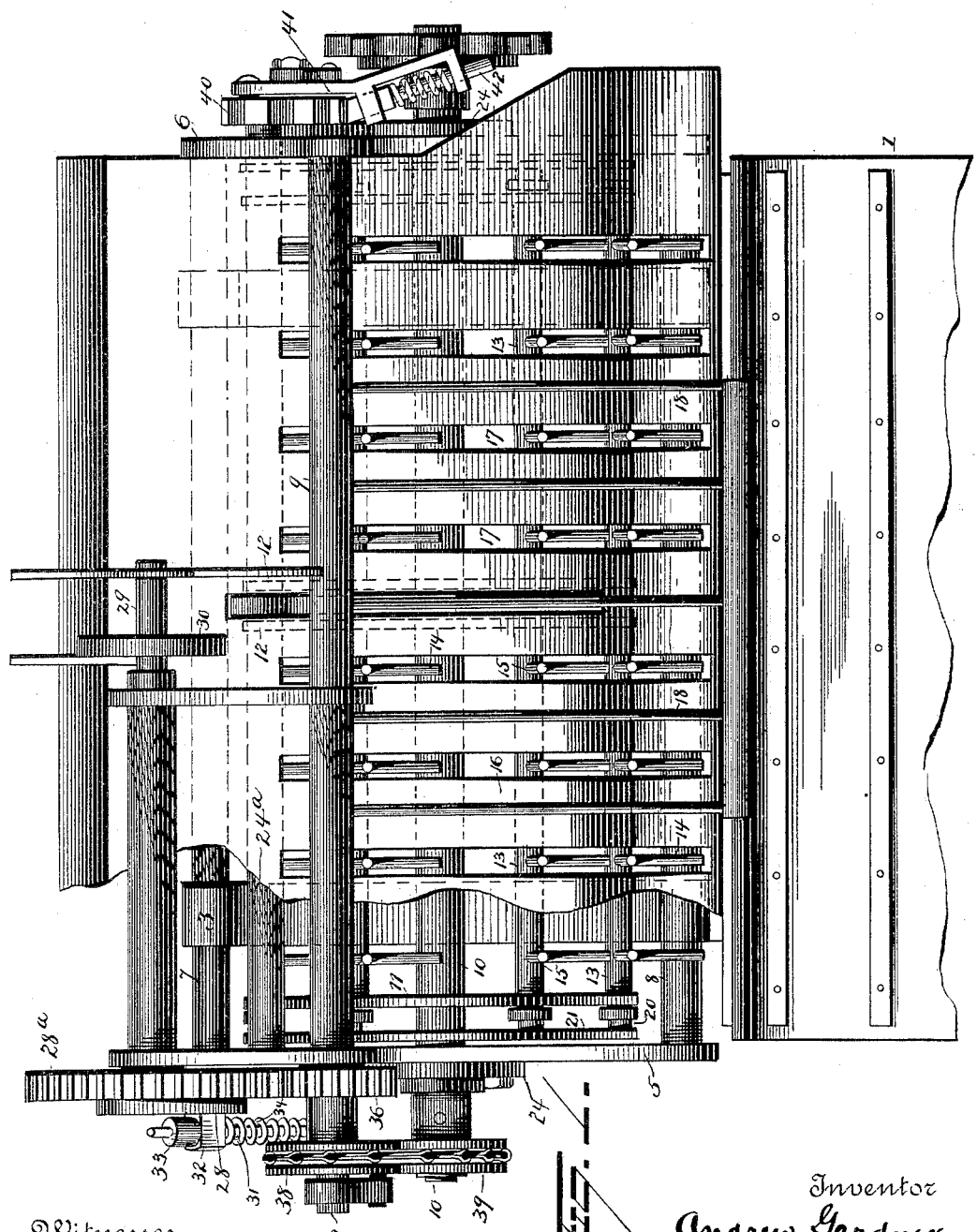
Figure 2:
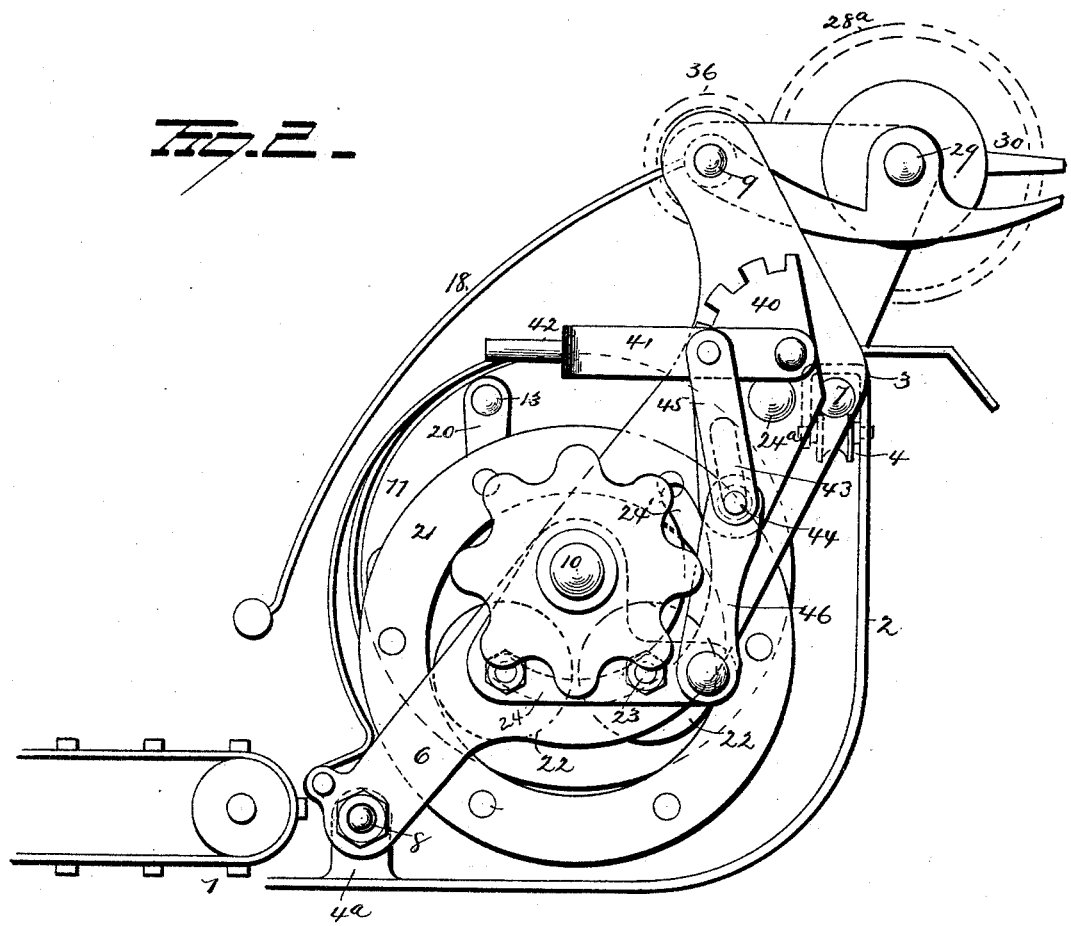
Figure 3:
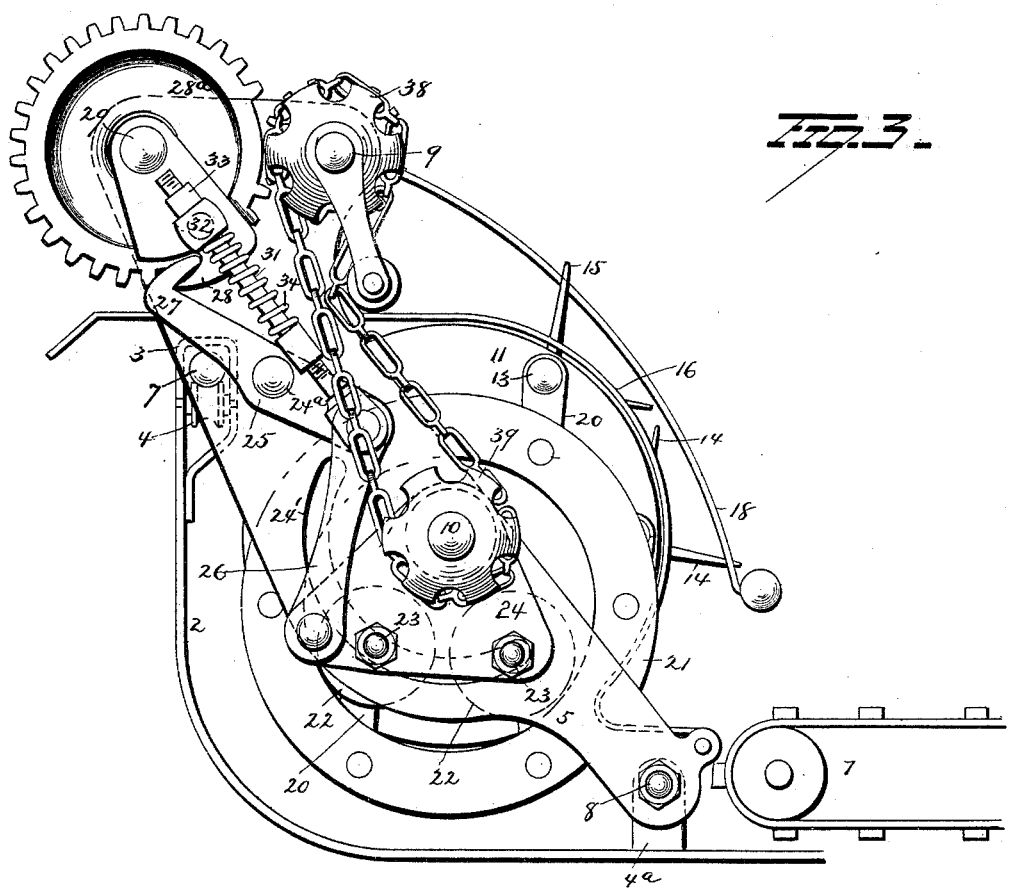
Figure 5:
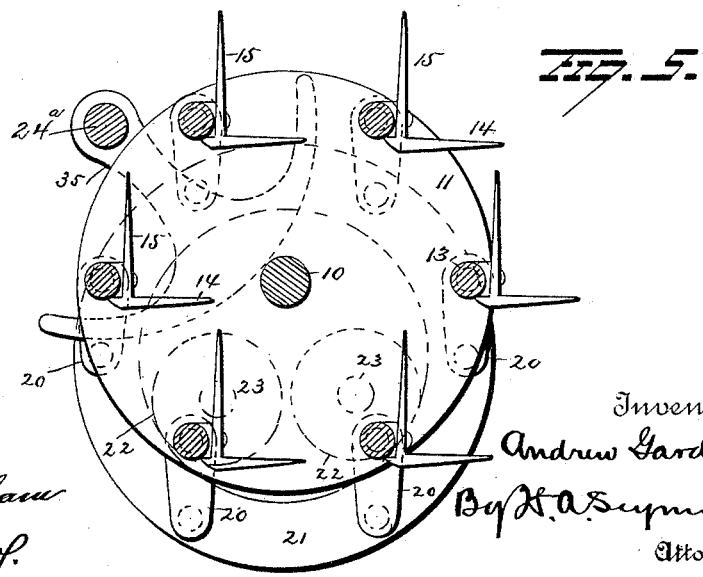

In the accompanying drawings, Figure 1 is a plan view. Figs. 2 and 3 are opposite end views. Fig. 4 is a side elevation. Fig. 5 is a sectional view. Figs. 6 and 7 are views of parts removed. Fig. 8 is a sectional view showing the needle and teeth when rocked from their normal positions and the position of the parts with relation to the driving wheel. Fig. 9 is a view of the elevator and packer frame.

The frame of the machine only partially shown, on which the parts of the attachment are supported, comprises the grain platform not shown, provided with the endless carrier 1 over which the grain is carried as fast as cut and the arms 2, 2, which extend outward and then upward from the platform. At their upper ends these arms are provided with loops 3, 3, in which grooved rollers 4, 4, are journaled, and adjacent to the platform these arms are also provided with loops $4^a$, $4^a$, which may or may not have rollers in them accordingly as desired.

The framework of the elevating and packing mechanism comprises the front and rear standards, 5 and 6 and the cross rods or bars 7, 8 and 9 connecting said standards. The rods or bars 7 and 8 extend through the loops 3, 3, and $4^a$, $4^a$, respectively and are carried on the rollers 4, the object of this construction being to provide for shifting the elevating and packing mechanism in order to center it properly relative to the length of the grain. This shifting of the elevating and packing mechanism is accomplished in any approved manner.

In the frame of the elevating and packing mechanism the shaft 10 is revolubly supported, the ends protruding some distance beyond the standards 5 and 6. Secured on this shaft within the standards are the disks or supports 11, 11, and in addition to these disks or supports a pair of disks or supports 12, 12, are secured on the shafts near its center, they being separated as shown by sufficient space to allow a needle or binding arm to operate between them. These disks or supports 11, 11, 12, 12, should be of a diameter substantially equal to the vertical distance between the platform conveyer and the top of the driving wheel. Loosely mounted in these disks or supports at or near their peripheries are the shafts 13, 13, to which the rake teeth 14 and 15 are secured. These teeth are arranged in two sets extending approximately at right angles to each other, and means are provided, as will be hereinafter described, for maintaining these teeth either normally in approximately horizontal and vertical positions or rocked backward throughout their entire rotation. The arrangement is such that the horizontal teeth 14 have a forward thrust as they come nearest the platform taking the grain as fast as it is fed stubbleward, and elevating it to a point on the deck where the teeth gradually recede, when the vertical teeth 15 immediately enter back of the grain and force it on over the top of the deck and pack it into the bundle space. This deck is represented by the numeral 16. It is secured immediately over the shafts of the rake, and is provided with the slots 17, 17, through which the teeth pass in elevating the grain. The deck or cover 16 is curved inward or indented at the inner or lower side to form a cradle to receive the grain from the platform carrier, and thence curved upward and over the revolving rake and extended outward on a level from the central or highest point of the revolving rake over the driving wheel to form a binder table. A yielding guard 18 is secured at one end to the top connecting rod 9 of the elevator and packer frame, and extends over the revolving rake to prevent the grain from slipping from the teeth.

To return to the revolving rake, the mechanism for controlling the positions of the rake teeth will be described. On the outer ends of the shafts 13, 13, cranks 20, 20, are secured. The wrist pins of these cranks extend loosely into the rings 21, 21, located just inside of the front and rear standards 5 and 6, and it is by controlling the eccentrically movable position of these rings that the teeth are maintained either normally in approximately horizontal and vertical positions or inclined backward from these normal positions throughout their entire rotation, and the position of these rings 21, 21, is controlled by means of anti friction rollers 22, 22, adapted to bear against preferably the inner edges of the rings, which anti friction rollers are loosely supported on the pins 23, 23, and the latter project inwardly from the lower and outer ends of the hanger plates 24, 24, and the said hanger plates are loosely mounted on the outer projecting ends of the shaft 10. The front and rear standards 5 and 6 are provided with slots 24', 24', curved in the arc of a circle of which the shaft 10 is the center. And the pins 23, 23, pass loosely through these slots, so that by swinging the hanger plates the position of the anti friction rollers is changed, thereby changing the eccentric position of the rings 21, 21. As will be hereinafter described, these hanger plates 24, 24, are connected with arms on the adjacent rock shaft to which the needle is attached whereby the teeth of both sections are simultaneously controlled. These hanger plates are first swung by a backward movement given the rake teeth caused by the impact of grain in the bundle space after a certain amount of grain has accumulated therein. The effect of this is to throw the binding mechanism into gear as will hereinafter appear, after which the teeth are rocked still farther backward by means of the rocker plates 24, 24, being connected, as before referred to, with the needle shaft in order to prevent the feed of grain during the process of binding, thus keeping it from packing against the needle while a bundle is being bound.

The needle shaft $24^a$ is provided on its forward end with an arm 25 and one end of this arm is connected by a link 26 with the outer end of front hanger plate 24, and the opposite end of the arm is provided with a hook 27 adapted to normally engage hook 28 on the mutilated gear wheel $28^a$ and thus lock the parts against rotation. This mutilated gear wheel is secured on a shaft 29 supported in a rearwardly projecting sleeve on the front standard 5 and the opposite end of the shaft is provided with the ejectors 30. A pitman 31 extends from the point of connection of link 26 and arm 25 loosely through a hole in pivoted lug 32 on the mutilated gear wheel $28^a$, and the normal length of this pitman is adjusted by a nut 33 on the outer end of the pitman. This pitman by passing loosely through the pivoted lug 32 and being provided with the spring 34 is thus made slightly yielding in length by which means the spring 34 is made to furnish a yielding support to the rake teeth, allowing them to yield slightly backward when the bundle space becomes filled with grain. And as the pitman thus yields in length by the impact of grain against the teeth the hook 27 is thereby disengaged from the hook 28, when the wheel $28^a$ being left free to turn is forced around by the recoil of the spring 34 as the pitman resumes its normal length, until the space where the teeth are cut away passes the constantly moving pinion 36 and the teeth of the two wheels come into mesh, thus starting the binding mechanism by the impact of grain against the rake teeth. As soon as, and simultaneously with the binding mechanism being given a positive motion by the wheels 36 and $28^a$ coming into mesh the rake teeth are thereby rocked backward and again returned to their normal position by means of the connections, before referred to between the rock shaft $24^a$ and the hanger plates 24, 24, which control the position of the teeth. The pinion 36 is mounted on a stud on front standard 5, and is preferably kept in constant motion by means of a sprocket chain passing over sprocket wheels 38 and 39 secured respectively on the hub of gear wheel 36 and the end of shaft 10. The needle 35 on the shaft $24^a$ lies normally between the central disks 12, 12, and should be of substantially the same radius as these disks, and the shaft $24^a$ should be separated from the central rake shaft 10 by only sufficient distance to clear the periphery of the rake. As will be seen by the construction and combination of parts hereinbefore described the movements of the rake teeth and the needle from their normal positions are simultaneous, their return to normal positions being also simultaneous.

Thus far means have been described merely for operating the teeth of both sections simultaneously. Provision is also made for adjusting the inclination of the teeth of one section independently of the teeth of the other section for the purpose of straightening grain that comes obliquely to the rake. This is done in the following manner. On the rear end of the needle shaft 24ª the toothed segment 40 is secured the lower projecting end of which forms the arm which controls the position of the rear hanger plate 24. A hand lever 41 is pivotally secured to this segment and provided with a spring actuated latch 42 which operates in connection with the teeth of the segment. The lower projecting arm of the segment is provided with an elongated slot 43 in which the pin 44 operates. Links 45 and 46 extend in opposite directions from this pin and are pivotally connected at their outer ends respectively with the hand lever and the rear rocker plate adjacent to it. By setting the latch in different notches in the segment the radius of the pivotal connection 44 is changed, thereby changing the position of the hanger plates and thus changing the inclination of the teeth of that section. It is intended to perform this adjustment of the teeth at any time when the rake is in motion, and during the periods when the rock shaft 24ª is in its normal position. The segment 40 is attached to the shaft 24ª and rocks with it—this separate adjustment not affecting the simultaneous movements of the teeth of both sections except that the teeth of one section may be adjusted to rotate with a different inclination from the teeth of the other section. The whole mechanism may be operated from a drive or sprocket wheel on one end of shaft 10. Some slight changes in details might be made as for instance the spring on the pitman could be dispensed with when other means are employed for starting the binding mechanism than here described, and the upper ends of the front and rear standards 5 and 6 could be offset or bent outwardly to admit greater length of grain, and other slight changes might be resorted to in the form and arrangement of the several parts described as placing the vertical and horizontal teeth on alternate shafts without departing from the spirit and scope of my invention, and hence I do not wish to limit myself to the exact construction herein set forth, but, Having fully described my invention, what I claim as new and desire to secure by Letters Patent, is:

1. In a self binding harvester, the combination with an elevator and packer frame placed intermediate between the platform conveyer and driving wheel, of a sectional revolving rake mounted in said frame adjacent to the platform conveyer, the diameter of said rake being substantially equal to the vertical distance between the platform conveyer and the binder table, a binder table extending approximately on a level from the central or highest point of the rake outward over the driving wheel, a rock shaft placed beneath said binder table and approximately within the angle formed by the binder table and the periphery of the rake, and an underlying needle mounted on said rock shaft so as to lie normally between the sections of the rake, said needle having substantially the same radius as the rake, substantially as set forth.

2. In a self binding harvester, the combination with an elevator and packer frame placed intermediate between the platform conveyer and driving wheel, of a sectional revolving rake mounted in said frame adjacent to the platform conveyer, each section of the rake comprising circular supports having a diameter substantially equal to the vertical distance between the platform conveyer and the binder table, a series of toothed shafts loosely mounted in said supports, and means connected with a rock shaft for simultaneously controlling the teeth of both sections, said rock shaft being separated from the central rake shaft by only sufficient distance to clear the rake, an underlying needle having substantially the same radius as the rake mounted on said rock shaft so as to lie normally between the sections of the rake, and a binder table extending approximately on a level from the central or highest point of the rake outward over the driving wheel, substantially as set forth.

3. In a self binding harvester, the combination with an elevator and packer frame placed intermediate between the platform conveyer, and driving wheel, of a sectional revolving rake mounted in said frame adjacent to the platform conveyer, each section of the rake comprising circular supports, a series of shafts loosely mounted in said supports, teeth extending from each shaft at approximately right angles to each other, and means for normally maintaining said teeth in approximately horizontal and vertical positions throughout the revolution of the rake, a binder table extending outward from the central or highest point of the rake, and an adjacent rock shaft provided with a needle adapted to operate between the sections of the rake, substantially as set forth.

4. In a self binding harvester, the combination with an elevator and packer frame placed intermediate between the platform conveyer and driving wheel, of a sectional revolving rake mounted in said frame adjacent to the platform conveyer, each section of the rake comprising circular supports, a series of toothed shafts loosely mounted in said supports, cranks on the shafts a ring pivotally connected with the several cranks and a movable plate provided with anti friction rollers to bear against the edge of the ring to control its position, a rock shaft provided with a needle, adapted to operate between the two sections of the rake, and a binder table extending outward from the central or highest point of the rake, substantially as set forth.

5. In a self binding harvester, the combination with a transversely adjustable elevator and packer frame placed intermediate between the platform conveyer and driving wheel, of a sectional revolving rake mounted in said frame adjacent to the platform conveyer, each section of the rake comprising circular supports, a series of shafts loosely mounted in said supports, teeth extending from each shaft at approximately right angles to each other, cranks on the shafts, a ring pivotally connected with the several cranks, and a hanger plate loosely mounted on the central rake shaft provided with anti friction rollers to bear against the edge of the ring to control its position, an adjacent rock shaft provided with arms, links respectively connecting said crank arms and hanger plates, an underlying needle mounted on said rock shaft so as to lie normally between the two rake sections, and a slotted deck extending a short distance outward from adjacent to the platform conveyer, thence curved upward and extended outward over the rake to form a binder table, substantially as set forth.

6. The combination with a frame, of a revolving rake composed of two sections mounted on a central shaft, each section comprising circular supports, a series of shafts loosely mounted in said supports cranks on the shafts, a ring connecting these cranks, teeth extending from each shaft at approximately right angles to each other, and means connected with an adjacent rock shaft for either normally maintaining said teeth of both sections in approximately horizontal and vertical positions or inclined from their normal positions throughout the revolution of the rake, substantially as set forth.

7. In a self binding harvester, the combination with a frame, of a revolving rake composed of two sections, each section comprising circular supports, toothed shafts loosely mounted in said supports, cranks on the shafts, a ring pivotally connected to the several cranks, and a hanger plate loosely mounted on the central rake shaft, provided with anti friction rollers to bear against the edge of the ring to control its position, and a rock shaft provided with crank arms, links connecting said crank arms and hanger plates, said rock shaft being given a periodical movement by means of connection with the binding mechanism, substantially as set forth.

8. The combination with a frame, of a revolving rake composed of two sections mounted on a central shaft, each section comprising circular supports, toothed shafts loosely mounted in said supports cranks on these shafts, ring connecting the cranks, and means connected with crank arms on an adjacent rock shaft for simultaneously controlling the position of the teeth of both sections, one of said crank arms being provided with means for adjusting the radius of its pivotal connection with the means which control the inclination of the teeth of the corresponding section, whereby the teeth of one section may be adjusted to greater inclination than the teeth of the other, substantially as set forth.

9. The combination with a transversely adjustable frame comprising substantially the front and rear standards 5 and 6 connected by the cross rods or bars 7, 8 and 9, of a rotary shaft 10, two sections of a revolving rake mounted on said shaft between the standards 5 and 6, a rock shaft 24$^a$, a needle mounted on said rock shaft so as to lie normally between the two rake sections, a shaft 29 loosely mounted in a sleeve projecting rearwardly from the upper end of front standard 5, ejectors 30 mounted on the rear end of such shaft, a gear wheel mounted on the opposite end of said shaft, and a pitman connecting said gear wheel with a crank arm on shaft 24$^a$, substantially as set forth.

10. In a locking and tripping mechanism, for self binding harvesters, the combination with the rock shaft 24$^a$ and the gear wheel 28$^a$ mounted on the shaft 29, of an arm 25, mounted on shaft 24$^a$ provided with a hook 27 adapted to engage a hook 28 on the mutilated gear wheel 28$^a$, and a pitman 31 provided with a spring 34 yieldingly connecting arm 25 and gear wheel 28$^a$, substantially as set forth.

11. A revolving rake comprising supports shafts therein having teeth extending from them at approximately right angles to each other, means for normally maintaining said teeth approximately in horizontal and vertical positions during the entire revolution of the rake and the adjacent shafts of the rake located a distance apart greater than the length of the teeth, substantially as set forth.

12. A revolving frame composed of sections each section comprising supports, shafts therein having teeth extending from them at approximately right angles to each other, means for normally maintaining said teeth approximately in horizontal and vertical positions during the entire revolution of the rake, and the adjacent shafts of each section located a distance apart greater than the length of the teeth, substantially as set forth.

13. A revolving rake, comprising loosely mounted shafts, and teeth on each of these shafts extending approximately at right angles to each other, and means for maintaining the teeth pointing in the same directions throughout the rotation of the rake, said teeth being yieldingly supported and adapted to be backwardly inclined by the impact of the straw against them whereby the other parts of the machine are automatically set in motion, substantially as set forth.

14. The combination with a rotary shaft having circular supports thereon, of tooth carrying shafts loosely mounted in said supports, cranks on the shafts, rings with which these cranks are loosely connected, anti-friction rollers operating against the inner edges of these rings, and means for changing the position of the rollers whereby the rings are shifted and the teeth are rocked, substantially as set forth.

15. The combination with a rotary shaft having circular supports thereon, of tooth carrying shafts loosely mounted in the supports, rings operatively connected with the shafts for rocking them simultaneously, hanger plates loosely mounted in proximity to the rings and furnished with anti friction rollers, and means connected with the plates for rocking them whereby the position of the rollers relative to the rings is changed, substantially as set forth.

16. The combination with a rotary shaft having supports thereon, of shafts loosely mounted in the supports, rings operatively connected with the several shafts, a rotary shaft having a pinion thereon, a shaft having a mutilated gear wheel thereon, and means operatively connected with the rings, and the mutilated gear wheel for automatically locking and unlocking the mutilated gear wheel, substantially as set forth.

17. The combination with a revoluble rake having teeth loosely supported therein, of plates connected with lateral projections on the shafts on which the teeth are secured, vibratory devices having loose contact with the plates, needle mechanism, tripping mechanism connected with the needle mechanism and means connecting the vibratory devices with the needle mechanism for imparting movement to the trip mechanism, substantially as set forth.

18. The combination with a revoluble rake having loosely supported shafts carrying rake teeth, rotary plates provided each with a circular central slot connected with cranks on the tooth shafts, of vibratory devices having bearing contact with the inner edges of the plates, needle mechanism, tripping mechanism connected with the needle mechanism and mechanism connecting the vibratory devices with the needle mechanism for imparting movement to the trip mechanism, substantially as set forth.

19. The combination with a frame-work, of a revolving rake comprising a shaft, circular supports near its ends and near its center, toothed shafts loosely mounted in said supports, and a rocking shaft provided with a needle which operates between the central supports of the rake, substantially as set forth.

20. The combination with a rotary shaft, plates thereon, toothed shafts loosely mounted in the plates, rings loosely connected with the cranks on the toothed shafts, loosely mounted hangers having rollers thereon against which the inner edges of the rings bear, of a needle shaft having devices thereon connected with the hangers, gearing, locking mechanism, and a pitman extending from one of the devices on the needle shaft to the gearing, said pitman provided with a spring adapted yieldingly to sustain the rake teeth and throw the needle gearing into operation when the locking mechanism is disengaged, substantially as set forth.

21. In a grain binding harvester the combination with a revolving rake comprising revolving supports and rake teeth pivotally mounted thereon, eccentric rings connected with said rake teeth, rocker or hanger plates having rollers to run on said eccentric rings, a needle shaft, a lever carried by said needle shaft and having a hooked arm, a mutilated gear having a notched plate or lug with which said hooked arm engages, a pitman yieldingly connecting said lever with the mutilated gear, and gearing for transmitting motion to said mutilated gear, substantially as set forth.

22. The combination with a frame work, of a revolving rake comprising a shaft, supporting plates at its ends and near its center, toothed shafts loosely supported in the supporting plates, and a rocking shaft provided with a needle which operates between the central disks of the rakes, substantially as set forth.

In testimony whereof I have signed this specification in the presence of two subscribing witnesses.

ANDREW GARDNER.

Witnesses:
E. R. GARDNER,
C. W. SAVERY.